(12) United States Patent
Slabaugh et al.

(10) Patent No.: US 9,014,447 B2
(45) Date of Patent: Apr. 21, 2015

(54) SYSTEM AND METHOD FOR DETECTION OF LESIONS IN THREE-DIMENSIONAL DIGITAL MEDICAL IMAGE

(75) Inventors: Gregory Gibran Slabaugh, London (GB); Muhammad Musib Siddique, Essex (GB); Richard Graham Boyes, London (GB); Abdel Douiri, Reading (GB); Xujiong Ye, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 1088 days.

(21) Appl. No.: 12/714,233

(22) Filed: Feb. 26, 2010

(65) Prior Publication Data

US 2010/0220913 A1 Sep. 2, 2010

(30) Foreign Application Priority Data

Feb. 27, 2009 (GB) .................... 0903484.4

(51) Int. Cl.
*G06K 9/00* (2006.01)
*G06T 7/00* (2006.01)

(52) U.S. Cl.
CPC ..... *G06T 7/0012* (2013.01); *G06T 2207/10072* (2013.01); *G06T 2207/10132* (2013.01); *G06T 2207/20084* (2013.01); *G06T 2207/30032* (2013.01)

(58) Field of Classification Search
CPC .................. G06T 7/0012; G06T 2207/30032
USPC ......................................................... 382/131
See application file for complete search history.

(56) References Cited

U.S. PATENT DOCUMENTS

| | | | |
|---|---|---|---|
| 5,920,641 A * | 7/1999 | Ueberreiter et al. | 382/125 |
| 6,694,057 B1 * | 2/2004 | Miller et al. | 382/203 |
| 7,113,623 B2 * | 9/2006 | Chen et al. | 382/128 |
| 7,454,044 B2 * | 11/2008 | Truyen et al. | 382/128 |
| 7,616,818 B2 * | 11/2009 | Dewaele | 382/199 |
| 8,055,047 B2 * | 11/2011 | Sundaram et al. | 382/131 |

(Continued)

FOREIGN PATENT DOCUMENTS

| | | |
|---|---|---|
| EP | 0 609 922 A3 | 1/1996 |
| EP | 1 465 109 A3 | 8/2007 |
| GB | 2 431 537 A | 10/2005 |

OTHER PUBLICATIONS

Kawata Yet Al: "Curvature based analysis of internal structure of pulmonary nodules using thin-section CT images" Image Processing, 1998. ICIP 98. Proceedings. 1998 International Conference on Chicago, IL, USA Oct. 4-7, 1998., Los Alamitos, CA, USA,IEEE Comput. Soc, US, p. 851-855.*

(Continued)

*Primary Examiner* — Gandhi Thirugnanam
(74) *Attorney, Agent, or Firm* — Sughrue Mion, PLLC

(57) ABSTRACT

A system and method for characterizing a point in a three-dimensional digital medical image includes determining third order derivatives of the three-dimensional digital medical image at one or more points in the three-dimensional digital medical image. At each of the one or more points, one or more invariant or semi-invariant features that characterize a local geometry at the point is determined using the third order derivatives of the three-dimensional digital medical image. The invariant or semi-invariant features are used for automatic detection of lesions, abnormalities, and other anatomical structures of interest in the three-dimensional digital medical image.

24 Claims, 8 Drawing Sheets

(56) References Cited

U.S. PATENT DOCUMENTS

| | | | |
|---|---|---|---|
| 2002/0146160 A1* | 10/2002 | Parker et al. | 382/131 |
| 2004/0066958 A1* | 4/2004 | Chen et al. | 382/128 |
| 2004/0161141 A1* | 8/2004 | Dewaele | 382/132 |
| 2004/0234133 A1* | 11/2004 | Bohm et al. | 382/199 |
| 2005/0163384 A1* | 7/2005 | Avni et al. | 382/218 |
| 2005/0244042 A1* | 11/2005 | Sirohey et al. | 382/131 |
| 2005/0251347 A1* | 11/2005 | Perona et al. | 702/19 |
| 2006/0050944 A1* | 3/2006 | Takeo et al. | 382/132 |
| 2006/0222219 A1* | 10/2006 | Truyen et al. | 382/128 |
| 2007/0165921 A1* | 7/2007 | Agam et al. | 382/128 |
| 2008/0075328 A1* | 3/2008 | Sciammarella | 382/108 |
| 2008/0130974 A1* | 6/2008 | Xu et al. | 382/131 |
| 2008/0205749 A1* | 8/2008 | Sundaram et al. | 382/154 |
| 2009/0190815 A1* | 7/2009 | Dam et al. | 382/131 |
| 2009/0232376 A1* | 9/2009 | Raundahl et al. | 382/131 |
| 2010/0046813 A1* | 2/2010 | Takamoto et al. | 382/128 |
| 2010/0220913 A1* | 9/2010 | Slabaugh et al. | 382/131 |
| 2010/0303322 A1* | 12/2010 | Whelan et al. | 382/131 |

OTHER PUBLICATIONS

Gravesen Jet Al: "Constructing Invariant Fairness Measures for Surfaces", Advances in Computational Mathematics, vol. 17, 2002, pp. 67-88.*

J. Thirion et al., "Computing the Differential Characteristics of Isointensity Surfaces", 1995, Computer Vision and Image Understanding, vol. 61, No. 2, p. 190-202.*

P. Olver, "Differential Invariants of Surfaces", May 2007, http://www-users.math.umn.edu/~olver/t_/iowat.pdf, p. 1-65.*

D. Keren et al., "Recognizing Surfaces for 3D curves", 1998, Image Processing, 1998. ICIP 98. Proceedings. 1998 International Conference on, vol. 3, p. 551-555.*

J. Sullivan, "Curvatures of Smooth and Discrete Surfaces", 2008, Discrete Differential Geometry, Oberwolfach Seminars, vol. 38, 175-188.*

E. Mehlum et al, "Invariant smoothness measures for surfaces", 1998, Advances in Computational Mathematics 8, p. 49-63.*

P. Besl et al., "Invariant Surface Characteristics for 3D Object Recognition in Range Images", 1986, Computer Vision, Graphics and Image processing, p. 33-80.*

Author Unknown, (Discrete) Differential Geometry, 2005, http://graphics.stanford.edu/courses/cs468-10-fall/.../05_Diff_Geo.pdf, p. 1-58.*

Y. Wang et al., "Discrete Fundamental Theorem of Surfaces", 2012, http://www.cse.msu.edu/~ytong/DDG/DFF.pdf, p. 1-16.*

O. Monga et al., "Using Partial Derivatives of 3D Images to Extract Typical Surface Features", 1995, Computer Vision and Image Understanding, vol. 61, No. 2, p. 171-189.*

The European Search Report cited in Application No. 10154156.3-2319, dated Jun. 1, 2010.

Ting Chen et al., "A hybrid framework for 3D medical image segmentation," Medical Image Analysis 9 (2005) pp. 547-565.

Jianhua Yao et al., "3D colonic polyp segmentation using dynamic deformable surfaces," Medical Imaging 2004, Proc. of SPIE, vol. 5369, (2004) pp. 280-289.

Y. Kawata, et al., "Curvature Based Analysis of Internal Structure of Pulmonary Nodules Using Thin-section CT Images," IEEE (1998) pp. 851-855.

The UKIPO Search Report cited in GB0903485.1, dated Jun. 30, 2009, 2 pages.

Lingxiao Zhao, Charl P. Botha, Javier O. Bescos, Roel Truyen, Frans M. Vos and Frits H. Post, "Lines of Curvature for Polyp Detection in Virtual Colonscopy" (IEEE Transactions on Visualization and Computer Graphics, vol. 12, No. 5, Sep./Oct. 2006, pp. 885 to 892).

ter Haar Romeny, B.M., "Biomedical Image Analysis (Design of Algorithms with Mathematica)" (Proceedings International Mathematica Symposium 2005, Aug. 5-8, 2005, Perth, Australia, pp. 1-4).

H. Yoshida, Y. Masutani, P. MacEneaney, D. T. Rubin, and A. H. Dachman. Computerized detection of colonic polyps at et colonography on the basis of volumetric features: Pilot study. Radiology, 222(2):327-336, 2002.

H. Yoshida and J. Nappi. Three-dimensional computer-aided diagnosis scheme for detection of colonic polyps. IEEE Transactions on Medical Imaging, 20(12):1261-1274, 2001.

E. Mehlum and T. Christian. Invariant smoothness measures for surfaces. Advances in Computational Mathematics, 8(1-2):49-63, 1998.

O. Monga and S. Benayoun. Using partial derivatives of 3d images to extract typical surface features. Proceedings of the Third Annual Conference of Integrating Perception, Planning and Action, pp. 225-236, 1992.

J. Thirion and A. Gourdon. Computing the differential characteristics of isointensity surface. Computer Vision and Image Understanding, 61(2):190-202, 1995.

J. Gravesen and M. Ungstrup. Constructing invariant fairness measures for surfaces. Advances in Computational Mathematics, 17(1-2):67-88, 2002.

* cited by examiner

SYSTEM AND METHOD FOR DETECTION OF LESIONS IN THREE-DIMENSIONAL DIGITAL MEDICAL IMAGE

BACKGROUND OF THE INVENTION

1. Field of the Invention

The present invention relates to medical imaging and analysis. More particularly, the present invention relates to methods and apparatuses for detecting lesions, abnormalities or other anatomical structures in medical images.

2. Background Art

Medical imaging is generally recognized as key to better diagnosis and patient care. It has experienced explosive growth over the last few years due to imaging modalities such as x-ray, Computed Tomography (CT), ultrasound, Magnetic Resonance Imaging (MRI) and Positron Emission Tomography (PET). Conventionally, medical images have been inspected visually by highly-trained medical practitioners in order to identify anatomic structures of interest, such as lesions. However, the process can be tedious, time consuming and must be performed with great care.

Computed Tomography Colonography (CTC) is a form of medical imaging that has been used for the detection and screening of colonic cancers. The purpose of CTC is to locate and identify polyps on the colon wall by computationally processing CT scans. A polyp is an abnormal growth on a mucous membrane, and may be benign or malignant (cancerous). The effectiveness of CTC is hindered by the large amount of data generated by a CTC scan, variability among human experts and the complexity of the classification. A typical modern CTC scan produces around one thousand axial CT images (slices) for the supine and prone data sets. To address these problems, a number of Computer Aided Detection (CAD) schemes for detecting polyps with CTC have been proposed.

Existing CAD algorithms detect polyps through their shapes by estimating curvature, either directly or indirectly, and define features based on these curvatures and use them in the detection and classification phases. For example, Yoshida et al. [1, 2] characterized several features including the shape index, curvedness, gradient concentration and directional gradient concentration from a conventional label segmentation of the colon wall to try to distinguish polyps from the normal colon tissues. However, Yoshida et al.'s method can sometimes fail to distinguish polyps from the colon wall adequately.

Thus, there is a need for improved methods for computer aided detection of lesions, abnormalities or other anatomical structures in medical images. In particular, there is a need for an improved automated system for detecting and classifying polyps, especially for use in Computed Tomography Colonography, that is able to distinguish polyps from the surrounding tissue more reliably.

BRIEF SUMMARY OF THE INVENTION

It is a preferred aim of the invention to overcome or mitigate the deficiencies in known methods for computer-aided detection of lesions, abnormalities and other anatomical structures in medical images.

A first aspect of the invention provides a computer-implemented method of characterising points in a three-dimensional digital medical image, the method comprising: determining third order derivatives of the image at one or more points within the image; and determining, at each of the one or more points, one or more invariant features that characterise the local geometry at the point using the third order derivatives.

Performing a third order analysis allows more reliable detection of lesions, abnormalities and other anatomical structures. This is because the third order analysis allows very subtle variations in curvature at the lesion or abnormality to be captured and quantized.

The invariant features are very effective at distinguishing lesions (such as polyps) from other features (such as healthy tissue, air and tagging fluid) in a medical image. This is particularly useful for the computer-aided detection of lesions. Furthermore, effective computer-aided detection of lesions can be achieved using only the six invariant features disclosed herein, whereas a far larger number of conventional figures of merit (such as shape index and curvature) may be required to achieve equally effective detection. This helps to reduce the time and computational resources necessary for computer-aided detection of lesions.

In the context of CT colonography, the invariant features are particularly useful for differentiating polyps from the colon wall or haustral folds. In the three-dimensional volumetric data generated by a CT scan, polyps appear as a concave composition holding on to the colonic wall, whereas folds appear as elongated, ridge-like structures and the colonic walls appear as nearly flat, convex structures. Hence, the invariant features capture the local changes in curvatures of an iso-surface at a voxel and can discriminate among polyps, folds, and colonic walls effectively.

The term "point" as used herein is preferably to be understood to be synonymous with the term "voxel". Preferably the term "derivatives of an image" is to be understood to refer to the spatial derivatives (that is, the derivatives with respect to a particular direction) of the intensity values within the image. Preferably, the invariant features characterise variations in local curvature at the point in question.

Preferably the method further comprises calculating covariant derivatives using the derivatives of the image. Preferably the invariant features are determined using the covariant derivatives.

A further aspect of the invention provides a computer-implemented method of characterising points in a three dimensional digital medical image, the method comprising: determining third order derivatives of the image at one or more points within the image; and determining, at each of the one or more points, one or more semi-invariant features that characterise the local geometry at the point using the third order derivatives.

The semi-invariant features provide the same advantages as the invariant features. An additional advantage of semi-invariant features is that they are faster and easier to compute than invariant features. Preferably the semi-invariant features characterise variations in local curvature at the point in question. Preferably the semi-invariant features are determined using derivatives of the image in Cartesian coordinates.

Preferably, local geometry is determined using an implicit iso-surface. Calculating the third order derivatives and invariant/semi-invariant features using an implicit iso-surface requires less computation than calculating them by determining an analytic expression for the surface.

Preferably the invariant or semi-invariant features are calculated using first, second, and third order derivatives of the image.

Preferably either method further comprises using the features to identify an anatomical structure in the image. Preferably either method further comprises using the invariant or semi-invariant features to identify a lesion in the image. Preferably the invariant or semi-invariant features are used to reduce false positives when identifying lesions in the image. Preferably the medical image comprises an image of at least a part of an organ. Preferably either method further comprises pre-processing the image. Preferably either method further comprises pre-processing the image to reduce noise. Preferably either method further comprises using the features to segment the image into a plurality of labels. Preferably either method further comprising using the features to derive a spatial transformation for aligning the image with one or more further images and, more preferably, the method further comprises applying the spatial transformation to the image to align the image with the one or more further images. Preferably the medical image is a CT image, an MR image, a PET image or an ultrasound image.

A further aspect of the invention provides a computer readable medium comprising instructions which, when executed by a suitable computer, cause the computer to perform a method as herein described. A further aspect the invention provides a computer program comprising program code arranged to perform a method as herein described when executed by a suitable processor. A further aspect of the invention provides a computer program product comprising a computer program as herein described.

A further aspect of the invention provides an apparatus arranged to perform either of the methods. The apparatus may comprise: means for determining third order derivatives of the image at one or more points within the image; and means for determining, at each of the one or more points, one or more invariant features (or one or more semi-invariant features) that characterise the local geometry at the point using the third order derivatives.

BRIEF DESCRIPTION OF THE DRAWINGS/FIGURES

Preferred features of the invention will now be described, purely by way of example, with reference to the accompanying drawings in which.

DETAILED DESCRIPTION OF EMBODIMENTS

Figure 1:
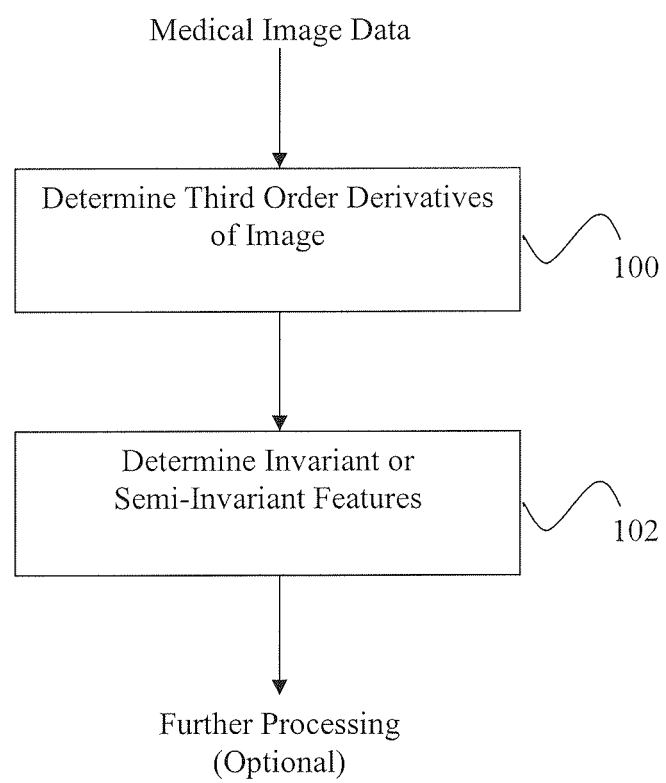
FIG. 1 is a schematic diagram of a method for processing a medical image in accordance with the present invention.
Figure 2A:
FIG. 2 shows processed and unprocessed medical images of a polyp attached to a colon wall.
Figure 2B:
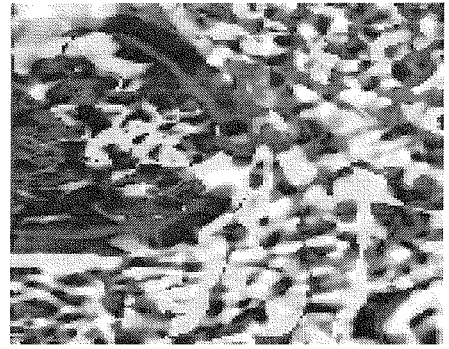
Figure 2C:
Figure 2D:
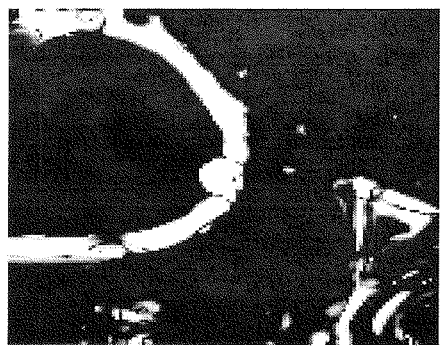
Figure 2E:
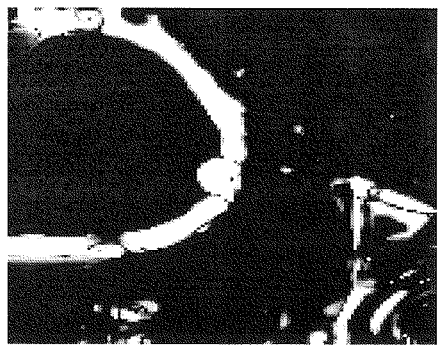
Figure 2F:
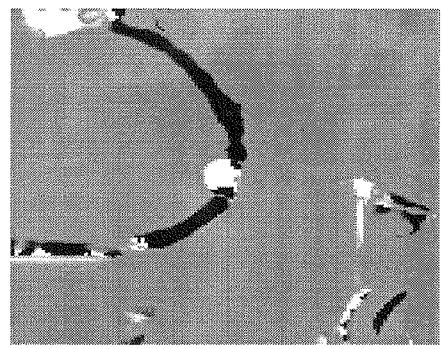
Figure 2G:
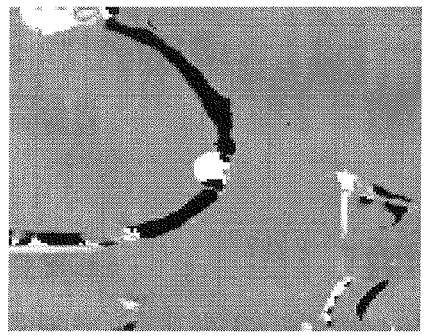
Figure 2H:
Figure 2I:
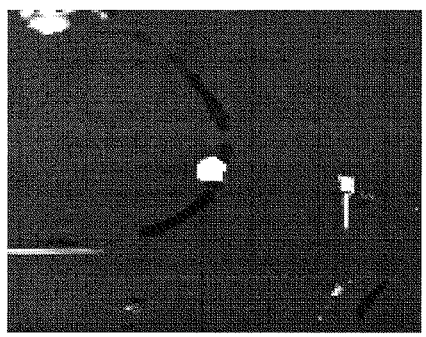
Figure 2J:
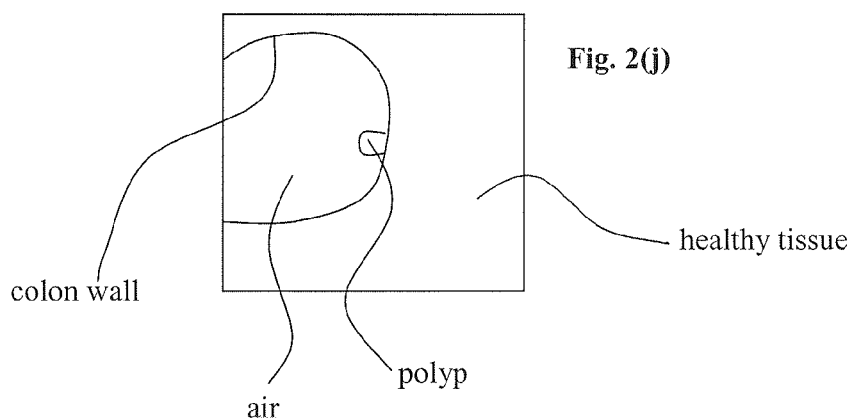
Figure 3A:
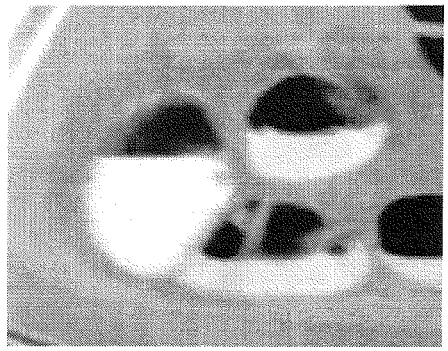
FIG. 3 shows processed and unprocessed medical images of a submerged polyp.
Figure 3B:
Figure 3C:
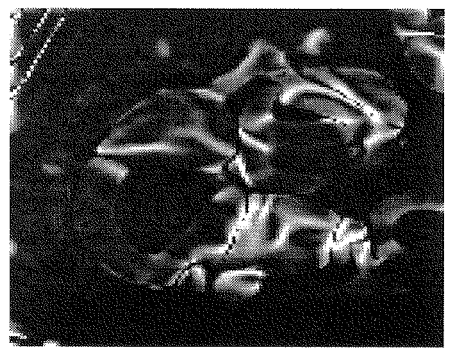
Figure 3D:
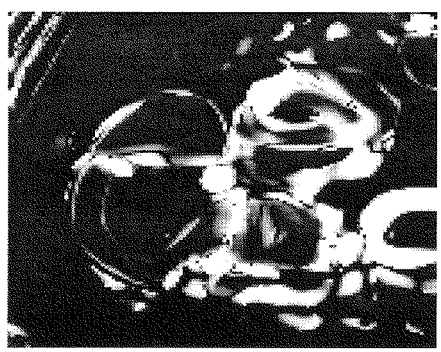
Figure 3E:
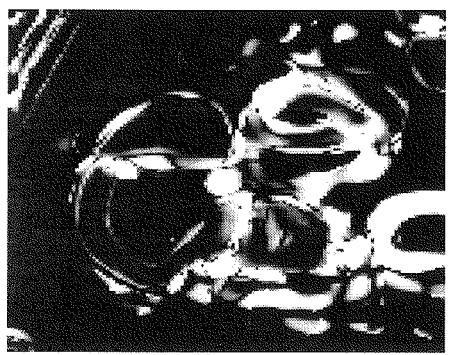
Figure 3F:
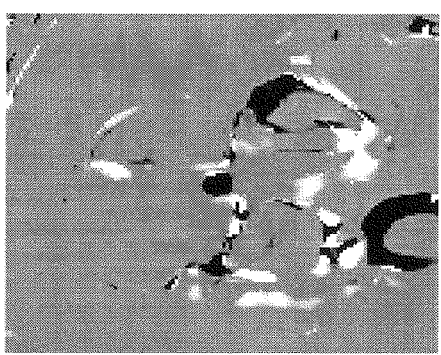
Figure 3G:
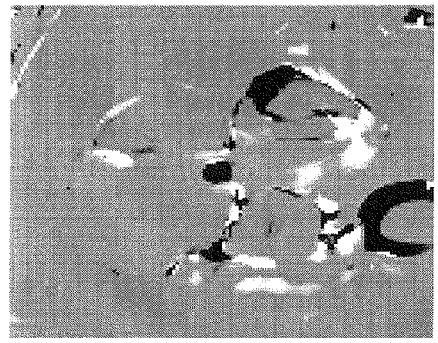
Figure 3H:
Figure 3I:
Figure 3J:
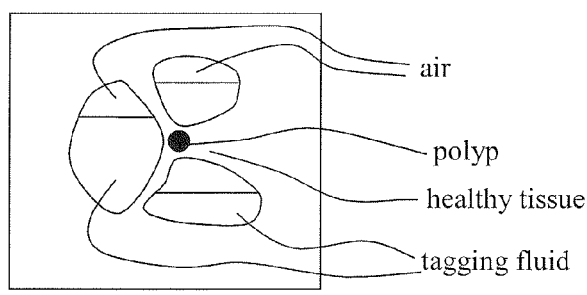

To assist in understanding the invention, the underlying theory of the invention will first be explained. The practical application of this theory to the detection and classification of lesions, abnormalities or other anatomical structures in medical images will then be explained.

Theory of the Invention

Consider a surface S with a regular parameterization S(u, v). A metric on the surface is a symmetric covariant 2-tensor with coefficients equal to the components of the first fundamental form:

$$E = g_{11} = S_u \cdot S_u$$
$$F = g_{12} = g_{21} = S_u \cdot S_v$$
$$G = g_{22} = S_v \cdot S_v \quad (1)$$

The reciprocal of the metric tensor is a contravariant 2-tensor with coefficients $g^{ij}$, which is defined by $g^{i\alpha}g_{\alpha j}=\delta_j^i$, where $\delta_j^i$ is the Kronecker delta symbol, which is 1 if i=j and zero otherwise. It is clear that as matrices $[g^{ij}]=[g_{ij}]^{-1}$, and hence:

$$g^{11} = \frac{G}{EG - F^2} \quad (2)$$
$$g^{12} = g^{21} = \frac{-F}{EG - F^2}$$
$$g^{22} = \frac{G}{EG - F^2}$$

Let B denote the symmetric covariant 2-tensor with coefficients equal to the components of the second fundamental form:

$$b_{11} = L = S_{uu} \cdot N = -S_u \cdot N_u$$
$$b_{12} = b_{21} = M = S_{uv} \cdot N = -S_u \cdot N_v = -S_v \cdot N_u$$
$$b_{22} = N = S_{vv} \cdot N = -S_v \cdot N_v \quad (3)$$

The unit normal vector field $$N = \frac{S_u \times S_v}{\sqrt{EG - F^2}} \quad (4)$$

can be considered as a map $M \rightarrow S^2$, the so-called Gauss map. The tangent planes $T_pM$ and $T_{N(p)}S^2$ are parallel planes in three-dimensional space, $R^3$, so the differential of the Gauss map is a linear map of $T_pM$ to itself. The bilinear form B can now be written as $B(v,w)=-dN(v) \cdot w$. The mean and the Gaussian curvature in this notation are given by $H=\frac{1}{2}\text{tr}(-dN)$ and $K=\det(-dN)$. The two basic second order invariants H and K are rational expressions in the components of the first and second fundamental form:

$$K = \frac{LN - M^2}{EG - F^2} \quad (5)$$

$$H = \frac{GL - 2FM + EN}{2(EG - F^2)} \quad (6)$$

The principal curvatures $\kappa_1$ and $\kappa_2$ can be computed by solving the quadratic equation:

$$\kappa^2 - 2H\kappa + K = 0 \quad (7)$$

which has solutions:

$$\kappa_1 = H + \sqrt{(H^2 - K)} \quad (8)$$

$$\underline{\kappa_1} = \underline{H} + \sqrt{(H^2 - K)} \quad (9)$$

$$\kappa_2 = H - \sqrt{(H^2 - K)} \quad (10)$$

In an existing technique for polyp detection, Yoshida et al. [1, 2] define the following two shape descriptors called shape index, SI, and curvedness, CV, which are used to detect the raised spherical region of a polyp:

$$SI = 0.5 - \frac{1}{\pi}\arctan\frac{\kappa_1 + \kappa_2}{\kappa_1 - \kappa_2} \tag{11}$$

$$CV = \frac{\sqrt{\kappa_1^2 + \kappa_2^2}}{2} \tag{12}$$

The inventors have discovered that methods based on the use of third order derivatives can be successfully used to segment, detect and classify polyp candidates in CTC scans. The inventors have also devised a novel way of formulating the third order derivative-based expressions using the volumetric data only and without explicitly generating the iso-surface from the volumetric data. The inventors have also derived unique intensity-based expressions for the basic invariant measures proposed by Gravesen and Ungstrup [7].

In order to get third order invariant expressions, covariant differentiation is used. The covariant derivative of the first fundamental form vanishes, so a third order invariant is constructed algebraically from the covariant differential of the second fundamental form, together with the first and second fundamental form. The covariant differential $\nabla B$ is a symmetric covariant 3-tensor with coefficients $b_{ij,k}$ given by Codazzi equations [3, 4]:

$$b_{11,1} = P = L_u + 2S_{uu} \cdot N_u = S_{uuu} \cdot N + 3S_{uu} \cdot N_u \tag{13}$$

$$b_{11,2} = Q = L_v + 2S_{uv} \cdot N_u = S_{uuv} \cdot N + S_{uu} \cdot N_v + 2S_{uv} \cdot N_u \tag{14}$$
$$= b_{12,1} = b_{21,1} = M_u + S_{uu} \cdot N_v + S_{uv} \cdot N_u$$

$$b_{22,1} = S = N_u + 2S_{uv} \cdot N_v = S_{uvv} \cdot N + S_{vv} \cdot N_u + 2S_{uv} \cdot N_v \tag{15}$$

$$b_{22,2} = T = N_v + 2S_{vv} \cdot N_v = S_{vvv} \cdot N + 3S_{vv} \cdot N_v \tag{16}$$

$$\tag{17}$$

Invariant functions are obtained by contracting the tensor product $(\nabla B) \otimes (\nabla B)$. As $\nabla B$ is symmetric there are only two different contractions, giving rise to two invariant functions. A further four invariant functions are obtained by contracting the tensor products $B \otimes (\nabla B) \otimes (\nabla B)$, $B \otimes B \otimes (\nabla B) \otimes (\nabla B)$ and $B \otimes B \otimes B \otimes (\nabla B) \otimes (\nabla B)$.

The six third order invariants can be directly computed in any parameterisation using the following equations:

$$\Theta_1 = g^{i\alpha}g^{j\beta}g^{k\gamma}b_{ij,k}b_{\alpha\beta,\gamma} \tag{18}$$

$$\Theta_2 = g^{ij}g^{\alpha\beta}g^{k\gamma}b_{ij,k}b_{\alpha\beta,\gamma} \tag{19}$$

$$\Theta_3 = g^{i\alpha}g^{j\beta}g^{kl}g^{\delta\gamma}b_{l\delta}b_{ij,k}b_{\alpha\beta,\gamma} \tag{20}$$

$$\Theta_4 = g^{ij}g^{\alpha\beta}g^{kl}g^{\delta\gamma}b_{l\delta}b_{ij,k}b_{\alpha\beta,\gamma} \tag{21}$$

$$\Theta_5 = g^{il}g^{\alpha\delta}g^{jm}g^{\beta\xi}g^{k\gamma}b_{l\delta}b_{m\xi}b_{ij,k}b_{\alpha\beta,\gamma} \tag{22}$$

$$\Theta_6 = g^{il}g^{\alpha\delta}g^{jm}g^{\beta\xi}g^{kn}g^{\gamma n}b_{l\delta}b_{m\xi}b_{n\eta}b_{ij,k}b_{\alpha\beta,\gamma} \tag{23}$$

The six third order invariants computed in principal directions lead to the following equations:

$$\Theta_1 = P^2 + 3Q^2 + 3S^2 + T^2 \tag{24}$$

$$\Theta_2 = (P+S)^2 + (Q+T)^2 \tag{25}$$

$$\Theta_3 = \kappa_1(P^2 + 2Q^2 + S^2) + \kappa_2(Q^2 + 2S^2 + T^2) \tag{26}$$

$$\Theta_4 = \kappa_1(P+S)^2 + \kappa_2(Q+T)^2 \tag{27}$$

$$\Theta_5 = \kappa_1^2(P^2 + Q^2) + 2\kappa_1\kappa_2(Q^2 + S^2) \tag{28}$$

$$+\kappa_2^2(S^2 + T^2) \tag{29}$$

$$\Theta_6 = \kappa_1^3 P^2 + 3\kappa_1^2\kappa_2 Q^2 + 3\kappa_1\kappa_2^2 S^2 + \kappa_2^3 T^2 \tag{30}$$

Strictly speaking, if equations 24 to 30 are to be used to compute invariant features then. P, Q, S and T need to be calculated in the principal directions (i.e. in the directions of the normal plane where the curvature of the surface is maximal or minimal). However, it is computationally expensive to do so. The inventors have discovered that the equations 24 to 30 give similar results even if P, Q, S and T are computed using Cartesian coordinate directions, which are much easier and faster to compute. This simplification results in fast and practical semi-invariant features.

Computation of Third Order Derivatives of a Surface

Let f(x,y,z) be an intensity at each point of a smooth, three-dimensional image. That is, the image is "smooth" in the sense that it has no points of discontinuity at which its spatial derivatives are undefined. An image can be smoothed by processing the image with a filter algorithm, such as a known Gaussian filter algorithm. The equation for an implicit iso-intensity surface is:

$$f(x,y,z) = I, \tag{31}$$

where I is the fixed iso-value. Using the implicit function theorem, there exists locally a function ø such that (x=u, y=v, z=ø(u, v) and f(u, v, ø(u, v))=I. Taking the derivative of equation 31 with respect to u gives $$\frac{\partial f}{\partial x}\frac{\partial x}{\partial u} + \frac{\partial f}{\partial y}\frac{\partial y}{\partial u} + \frac{\partial f}{\partial z}\frac{\partial z}{\partial u} = 0 \tag{32}$$

$$f_x + f_z\frac{\partial \phi}{\partial u} = 0 \tag{33}$$

$$\frac{\partial \phi}{\partial u} = -\frac{f_x}{f_z}, \tag{34}$$

and similarly, $$\frac{\partial \phi}{\partial v} = -\frac{f_y}{f_z}. \tag{35}$$

Here, we have used the fact that $$\frac{\partial z}{\partial u} = \frac{\partial \phi}{\partial u}, \frac{\partial z}{\partial v} = \frac{\partial \phi}{\partial v},$$

as well as the standard notation $$f_x = \frac{\partial f}{\partial x}, f_y = \frac{\partial f}{\partial y} \text{ and } f_z = \frac{\partial f}{\partial z}.$$

The first fundamental form is the inner product on the tangent space of a surface in three-dimensional Euclidean space, and can be represented with the coefficients E, F, and G, which are defined as from the surface $S(u, v) = [u\ v,\ \varnothing(u, v)]^T$ as:

$$E = S_u \cdot S_u \tag{36}$$
$$= \left[1, 0, \frac{\partial \phi}{\partial u}\right]^T \cdot \left[1, 0, \frac{\partial \phi}{\partial u}\right]^T$$
$$= 1 + \frac{f_x^2}{f_z^2}$$

$$F = S_u \cdot S_v \tag{37}$$
$$= \left[1, 0, \frac{\partial \phi}{\partial u}\right]^T \cdot \left[0, 1, \frac{\partial \phi}{\partial v}\right]^T$$
$$= \frac{f_x f_y}{f_z^2}$$

$$G = S_v \cdot S_v \tag{38}$$
$$= \left[0, 1, \frac{\partial \phi}{\partial v}\right]^T \cdot \left[0, 1, \frac{\partial \phi}{\partial v}\right]^T$$
$$= 1 + \frac{f_y^2}{f_z^2}$$

The surface normal N is given as $$N = \frac{S_u \times S_v}{\|S_u \times S_v\|} \tag{39}$$
$$= \frac{\left[1, 0, -\frac{f_x}{f_z}\right]^T \times \left[0, 1, -\frac{f_y}{f_z}\right]^T}{\left\|\left[1, 0, -\frac{f_x}{f_z}\right]^T \times \left[0, 1, -\frac{f_y}{f_z}\right]^T\right\|}$$
$$= \frac{[f_x + f_y + f_z]^T}{(f_x^2 + f_y^2 + f_z^2)^{\frac{1}{2}}}$$

The second fundamental form is a quadratic form on the tangent plane of a smooth surface in the three-dimensional Euclidean space, and can be represented with the coefficients L, M and N. Together with the first fundamental form, it serves to define extrinsic invariants of the surface, its principal curvatures.

To determine the coefficients of the second fundamental form, it is useful to derive derivatives of $f_x$, $f_y$ and $f_z$ with respect to u and v. For example, we can derive $$\frac{\partial f_x}{\partial u} = \frac{\partial f x}{\partial x}\frac{\partial x}{\partial u} + \frac{\partial f x}{\partial y}\frac{\partial y}{\partial u} + \frac{\partial f_x}{\partial z}\frac{\partial z}{\partial u} \tag{40}$$
$$= f_{xx} \cdot (1) + f_{xy} \cdot (0) + f_{xz} \cdot \left(\frac{\partial \phi}{\partial u}\right)$$
$$= f_{xx} - \frac{f_x f_{xz}}{f_z}$$

and similarly, $$\frac{\partial f_x}{\partial v} = f_{xy} - \frac{f_y f_{xz}}{f_z} \tag{41}$$

$$\frac{\partial f_y}{\partial u} = f_{xy} - \frac{f_x f_{yz}}{f_z} \tag{42}$$

$$\frac{\partial f_y}{\partial v} = f_{yy} - \frac{f_y f_{yz}}{f_z} \tag{43}$$

-continued $$\frac{\partial f_z}{\partial u} = f_{xz} - \frac{f_x f_{zz}}{f_z} \tag{44}$$

$$\frac{\partial f_z}{\partial v} = f_{xz} - \frac{f_y f_{zz}}{f_z} \tag{45}$$

where $$f_{xx} = \frac{\partial^2 f}{\partial x^2},$$

$$f_{xy} = \frac{\partial^2 f}{\partial x \partial y},$$

$$f_{xz} = \frac{\partial^2 f}{\partial x \partial z},$$

$$f_{yy} = \frac{\partial^2 f}{\partial y^2},$$

$$f_{yz} = \frac{\partial^2 f}{\partial y \partial}$$

and $$f_{zz} = \frac{\partial^2 f}{\partial_z^2}.$$

The second order derivatives of the surface S with respect to u and V are then:

$$S_{uu} = \left[0, 0, \frac{\partial}{\partial u}\left(-\frac{f_x}{f_z}\right)\right]^T \tag{46}$$

$$S_{uv} = \left[0, 0, \frac{\partial}{\partial v}\left(-\frac{f_x}{f_z}\right)\right]^T \tag{47}$$

$$S_{vv} = \left[0, 0, \frac{\partial}{\partial v}\left(-\frac{f_y}{f_z}\right)\right]^T \tag{48}$$

which can be derived using:

$$\frac{\partial}{\partial u}\left(-\frac{f_x}{f_z}\right) = -\frac{1}{f_z}\frac{\partial fx}{\partial u} + \frac{f_x}{f_z^2}\frac{\partial f_z}{\partial u} \tag{49}$$
$$= \frac{-f_x^2 f_{zz} + 2f_x f_z f_{xz} - f_z^2 f_{xx}}{f_z^3}$$

$$\frac{\partial}{\partial v}\left(-\frac{f_x}{f_z}\right) = -\frac{1}{f_z}\frac{\partial f_x}{\partial v} + \frac{f_x}{f_z^2}\frac{\partial f_z}{\partial v} \tag{50}$$
$$= \frac{-f_z^2 f_{xy} + f_y f_z f_{xz} + f_x f_z f_{yz} - f_x f_y f_{zz}}{f_z^3}$$

$$\frac{\partial}{\partial v}\left(-\frac{f_y}{f_z}\right) = -\frac{1}{f_z}\frac{\partial f_y}{\partial v} + \frac{f_y}{f_z^2}\frac{\partial f_z}{\partial v} \tag{51}$$
$$= \frac{-f_y^2 f_{zz} + 2f_y f_z f_{yz} - f_z^2 f_{yy}}{f_z^3}$$

$$S_{uu} = \left[0, 0, \frac{-f_x^2 f_{zz} + 2f_x f_z f_{xz} - f_z^2 f_{xx}}{f_z^3}\right]^T \tag{52}$$

$$S_{uv} = \left[0, 0, \frac{-f_z^2 f_{xy} + f_y f_z f_{xz} + f_x f_z f_{yz} - f_x f_y f_{zz}}{f_z^3}\right]^T \tag{53}$$

$$S_{vv} = \left[0, 0, \frac{-f_y^2 f_{zz} + 2f_y f_z f_{yz} - f_z^2 f_{yy}}{f_z^3}\right]^T \tag{54}$$

With these derivatives in hand, the coefficients of the second fundamental form can be written as:

$$L = S_{uu} \cdot N \quad (55)$$
$$= \left[0, 0, \frac{-f_x^2 f_{zz} + 2 f_x f_z f_{xz} - f_z^2 f_{xx}}{f_z^3}\right]^T \cdot \frac{[f_x, f_y, f_z]^T}{(f_x^2 + f_y^2 + f_z^2)^{\frac{1}{2}}}$$
$$= \frac{-f_x^2 f_{zz} + 2 f_x f_z f_{xz} - f_z^2 f_{xx}}{f_z^2 (f_x^2 + f_y^2 + f_z^2)^{\frac{1}{2}}}$$

$$M = S_{uv} \cdot N \quad (56)$$
$$= \left[0, 0, \frac{-f_z^2 f_{xy} + f_y f_z f_{xz} + f_x f_z f_{yz} - f_x f_y f_{zz}}{f_z^3}\right]^T \cdot$$
$$\frac{[f_x, f_y, f_z]^T}{(f_x^2 + f_y^2 + f_z^2)^{\frac{1}{2}}}$$
$$= \frac{-f_z^2 f_{xy} + f_y f_z f_{xz} + f_x f_z f_{yz} - f_x f_y f_{zz}}{f_z^2 (f_x^2 + f_y^2 + f_z^2)^{\frac{1}{2}}}$$

$$N = S_{vv} \cdot N \quad (57)$$
$$= \left[0, 0, \frac{-f_y^2 f_{zz} + 2 f_y f_z f_{yz} - f_z^2 f_{yy}}{f_z^3}\right]^T \cdot$$
$$\frac{[f_x, f_y, f_z]^T}{(f_x^2 + f_y^2 + f_z^2)^{\frac{1}{2}}}$$
$$= \frac{-f_y^2 f_{zz} + 2 f_y f_z f_{yz} - f_z^2 f_{yy}}{f_z^2 (f_x^2 + f_y^2 + f_z^2)^{\frac{1}{2}}}$$

At this stage, principal curvatures, shape index and curvedness can be computed from equations 8, 10, 11 and 12 respectively.

Next, the equations for P, Q, S, and T are derived, which combined with the principal curvatures $\kappa_1$ and $\kappa_2$, are used in the third order invariant equations, defined in equations 18 to 23.

For this task, it is helpful to derive the following third order equations:

$$\frac{\partial f_{xx}}{\partial u} = \frac{\partial f_{xx}}{\partial x}\frac{\partial x}{\partial u} + \frac{\partial f_{xx}}{\partial y}\frac{\partial y}{\partial u} + \frac{\partial f_{xx}}{\partial z}\frac{\partial z}{\partial u} \quad (58)$$
$$= f_{xxx} \cdot (1) + f_{xxy} \cdot (0) + f_{xxz} \cdot \left(\frac{\partial \phi}{\partial u}\right)$$
$$= f_{xxx} - \frac{f_x f_{xxz}}{f_z} \quad (59)$$

and similarly, $$\frac{\partial f_{xx}}{\partial v} = f_{xxy} - \frac{f_y f_{xxz}}{f_z} \quad (60)$$

$$\frac{\partial f_{xy}}{\partial u} = f_{xxy} - \frac{f_x f_{xyz}}{f_z} \quad (61)$$

$$\frac{\partial f_{xy}}{\partial v} = f_{xyy} - \frac{f_y f_{xyz}}{f_z} \quad (62)$$

$$\frac{\partial f_{xz}}{\partial u} = f_{xxz} - \frac{f_x f_{xzz}}{f_z} \quad (63)$$

$$\frac{\partial f_{xz}}{\partial v} = f_{xyz} - \frac{f_y f_{xzz}}{f_z} \quad (64)$$

$$\frac{\partial f_{yy}}{\partial u} = f_{yyx} - \frac{f_x f_{yyz}}{f_z} \quad (65)$$

$$\frac{\partial f_{yy}}{\partial v} = f_{yyy} - \frac{f_y f_{yyz}}{f_z} \quad (66)$$

$$\frac{\partial f_{yz}}{\partial u} = f_{xyz} - \frac{f_x f_{yzz}}{f_z} \quad (67)$$

$$\frac{\partial f_{yz}}{\partial v} = f_{yyz} - \frac{f_y f_{yzz}}{f_z} \quad (68)$$

$$\frac{\partial f_{zz}}{\partial u} = f_{xzz} - \frac{f_x f_{zzz}}{f_z} \quad (69)$$

$$\frac{\partial f_{zz}}{\partial v} = f_{yzz} - \frac{f_y f_{zzz}}{f_z} \quad (70)$$

where $$f_{xxy} = \frac{\partial^3 f}{\partial x^2 \partial y},$$
$$f_{xyy} = \frac{\partial^3 f}{\partial x \partial y^2},$$
$$f_{yyy} = \frac{\partial^3 f}{\partial y^3} \text{ etc.}$$

The third order derivatives of the surface S (u, v) as a function of u and v can be expressed as derivatives of this image as:

$$S_{uuu} = \left[0, 0, \frac{\partial}{\partial u}\left(-\frac{f_x^2 f_{zz} + 3 f_x f_z f_{xz} - f_z^2 f_{xx}}{f_z^3}\right)\right]^T \quad (71)$$

$$= \left[0, 0, \frac{1}{f_z^3}\begin{pmatrix} -2 f_x \frac{\partial f_x}{\partial u} f_{zz} - f_x^2 \frac{\partial f_{zz}}{\partial u} + 2 \frac{\partial f_x}{\partial u} f_z f_{xz} + \\ 2 f_x \frac{\partial f_z}{\partial u} f_{xz} + 2 f_x f_z \frac{\partial f_{xz}}{\partial u} - \\ 2 f_z \frac{\partial f_z}{\partial u} f_{xx} - f_z^2 \frac{\partial f_{xx}}{\partial u} \end{pmatrix} - 3 \frac{-f_x^2 f_{zz} + 2 f_x f_z f_{xz} - f_z^2 f_{xx}}{f_z^4} \frac{\partial f_z}{\partial u} \right]^T$$

$$= \left[0, 0, \frac{-6 f_x f_z f_{xz}^2 + 3 f_x f_z^2 f_{xxz} -}{f_z^4} + \frac{3 f_x^2 f_z f_{xzz} + f_x^3 f_{zzz} - f_z^3 f_{xxx}}{f_z^4} + \frac{9 f_x^2 f_{xz} f_{zz} + 3 f_z^2 f_{xx} f_{xz} -}{f_z^4} - \frac{3 f_x f_z f_{xx} f_{zz}}{f_z^4} - \frac{3 f_x^3 f_z^2}{f_z^5}\right]^T$$

and similarly, $$S_{vvv} = \left[0, 0, \frac{\partial}{\partial v}\left(-\frac{f_y^2 f_{zz} + 2f_y f_z f_{yz} - f_z^2 f_{yy}}{f_z^3}\right)\right]^T \quad (72)$$

$$= \left[0, 0, \frac{1}{f_z^3}\begin{pmatrix} -2f_y \frac{\partial f_y}{\partial v} f_{zz} - f_y^2 \frac{\partial f_{zz}}{\partial v} + 2\frac{\partial f_y}{\partial v} f_z f_{yz} + \\ 2f_y \frac{\partial f_z}{\partial v} f_{yz} + 2f_y f_z \frac{\partial f_{yz}}{\partial v} - \\ 2f_z \frac{\partial f_z}{\partial v} f_{yy} - f_z^2 \frac{\partial f_{yy}}{\partial v} \end{pmatrix} - 3\frac{-f_y^2 f_{zz} + 2f_y f_z f_{yz} - f_z^2 f_{yy}}{f_z^4} \frac{\partial f_z}{\partial v}\right]$$

$$= \left[0, 0, \frac{-6f_y f_z f_{yz}^2 + 3f_y f_z^2 f_{yyz} - 3f_y^2 f_z f_{yzz} + f_y^3 f_{zzz} - f_z^3 f_{yyy}}{f_z^4} + \frac{9f_y^2 f_{yz} f_{zz} + 3f_z^2 f_{yy} f_{yz} - 3f_y f_z f_{yy} f_{zz}}{f_z^4} - \frac{3f_y^3 f_{zz}^2}{f_z^5}\right]^T$$

$$S_{uuv} = \left[0, 0, \frac{6f_y f_x f_{xz} f_{zz} - 4f_x f_z f_{yz} f_{xz} - }{f_z^4} + \frac{2f_x f_z f_{yx} f_{zz} - f_z f_x^2 f_{yzz}}{f_z^4} + \frac{f_y f_x^2 f_{zzz} + 2f_z^2 f_{yxz} f_{xz} - 2f_y f_z f_{xz}^2 +}{f_z^4} + \frac{2f_x f_z^2 f_{yxz} - 2f_y f_x f_z f_{xzz}}{f_z^4} + \frac{f_z^2 f_{xx} f_{yz} - f_y f_z f_{xx} f_{zz} - f_z^3 f_{yxx}}{f_z^4}\right] \quad (73)$$

$$S_{uvv} = \left[0, 0, \frac{f_y f_z f_{xz}^2 + 3f_z^2 f_{yz} f_{xz} - 4f_y f_x f_{xz} f_{zz}}{f_z^4} - \frac{3f_y f_x^2 f_{zz}^2}{f_z^5} \\ \frac{2f_y^2 f_z f_{xy} f_{zz} - f_z f_y^2 f_{xzz}}{f_z^4} + \\ \frac{f_x f_y^2 f_{zzz} + 2f_z^2 f_{xy} f_{yz} - 2f_x f_z f_{yz}^2 +}{f_z^4} + \\ \frac{2f_y f_z^2 f_{xyz} - 2f_x f_y f_z f_{yzz}}{f_z^4} + \\ \frac{f_z^2 f_{yy} f_{xz} - f_x f_z f_{yy} f_{zz} - f_z^3 f_{xyy}}{f_z^4} + \\ \frac{f_x f_z^2 f_{yyz} + 3f_y^2 f_{xz} f_{zz}}{f_z^4} - \frac{3f_x f_y^2 f_{zz}^2}{f_z^5}\right]^T \quad (74)$$

Derivatives of the surface normal N with respect to u and v are derived as:

$$N_u = \frac{\partial}{\partial u}\left[\frac{[f_x, f_y, f_z]^T}{(f_x^2 + f_y^2 + f_z^2)^{\frac{1}{2}}}\right] \quad (75)$$

$$= \hat{x}\left[\frac{1}{(f_x^2 + f_y^2 + f_z^2)^{\frac{1}{2}}} \frac{\partial f_x}{\partial u} - \frac{f_x^2}{(f_x^2 + f_y^2 + f_z^2)^{\frac{3}{2}}} \frac{\partial f_x}{\partial u}\right] +$$

$$\hat{y}\left[\frac{1}{(f_x^2 + f_y^2 + f_z^2)^{\frac{1}{2}}} \frac{\partial f_y}{\partial u} - \frac{f_y^2}{(f_x^2 + f_y^2 + f_z^2)^{\frac{3}{2}}} \frac{\partial f_y}{\partial u}\right] +$$

$$\hat{z}\left[\frac{1}{(f_x^2 + f_y^2 + f_z^2)^{\frac{1}{2}}} \frac{\partial f_z}{\partial u} - \frac{f_z^2}{(f_x^2 + f_y^2 + f_z^2)^{\frac{3}{2}}} \frac{\partial f_z}{\partial u}\right]$$

$$= \hat{x}\left(\frac{1}{(f_x^2 + f_y^2 + f_z^2)^{\frac{1}{2}}} - \frac{f_x^2}{(f_x^2 + f_y^2 + f_z^2)^{\frac{3}{2}}}\right)\left(f_{xx} - \frac{f_x f_{xz}}{f_z}\right) +$$

$$\hat{y}\left(\frac{1}{(f_x^2 + f_y^2 + f_z^2)^{\frac{1}{2}}} - \frac{f_y^2}{(f_x^2 + f_y^2 + f_z^2)^{\frac{3}{2}}}\right)\left(f_{xy} - \frac{f_x f_{yz}}{f_z}\right) +$$

$$\hat{z}\left(\frac{1}{(f_x^2 + f_y^2 + f_z^2)^{\frac{1}{2}}} - \frac{f_z^2}{(f_x^2 + f_y^2 + f_z^2)^{\frac{3}{2}}}\right)\left(f_{xz} - \frac{f_x f_{zz}}{f_z}\right)$$

$$= \hat{x}\left(\frac{f_y^2 + f_z^2}{(f_x^2 + f_y^2 + f_z^2)^{\frac{3}{2}}}\right)\left(f_{xx} - \frac{f_x f_{xz}}{f_z}\right) +$$

$$\hat{y}\left(\frac{f_x^2 + f_z^2}{(f_x^2 + f_y^2 + f_z^2)^{\frac{3}{2}}}\right)\left(f_{xy} - \frac{f_x f_{yz}}{f_z}\right) +$$

$$\hat{z}\left(\frac{f_x^2 + f_y^2}{(f_x^2 + f_y^2 + f_z^2)^{\frac{3}{2}}}\right)\left(f_{xz} - \frac{f_x f_{zz}}{f_z}\right) \quad (75)$$

$$N_v = \frac{\partial}{\partial v}\left[\frac{[f_x, f_y, f_z]^T}{(f_x^2 + f_y^2 + f_z^2)^{\frac{1}{2}}}\right] \quad (76)$$

$$= \hat{x}\left[\frac{1}{(f_x^2 + f_y^2 + f_z^2)^{\frac{1}{2}}} \frac{\partial f_x}{\partial v} - \frac{f_x^2}{(f_x^2 + f_y^2 + f_z^2)^{\frac{3}{2}}} \frac{\partial f_x}{\partial v}\right] +$$

$$\hat{y}\left[\frac{1}{(f_x^2 + f_y^2 + f_z^2)^{\frac{1}{2}}} \frac{\partial f_y}{\partial v} - \frac{f_y^2}{(f_x^2 + f_y^2 + f_z^2)^{\frac{3}{2}}} \frac{\partial f_y}{\partial v}\right] +$$

$$\hat{z}\left[\frac{1}{(f_x^2 + f_y^2 + f_z^2)^{\frac{1}{2}}} \frac{\partial f_z}{\partial v} - \frac{f_z^2}{(f_x^2 + f_y^2 + f_z^2)^{\frac{3}{2}}} \frac{\partial f_z}{\partial v}\right]$$

$$= \hat{x}\left(\frac{1}{(f_x^2 + f_y^2 + f_z^2)^{\frac{1}{2}}} - \frac{f_x^2}{(f_x^2 + f_y^2 + f_z^2)^{\frac{3}{2}}}\right)\left(f_{xy} - \frac{f_y f_{xz}}{f_z}\right) +$$

$$\hat{y}\left(\frac{1}{(f_x^2 + f_y^2 + f_z^2)^{\frac{1}{2}}} - \frac{f_y^2}{(f_x^2 + f_y^2 + f_z^2)^{\frac{3}{2}}}\right)\left(f_{yy} - \frac{f_y f_{yz}}{f_z}\right) +$$

$$\hat{z}\left(\frac{1}{(f_x^2 + f_y^2 + f_z^2)^{\frac{1}{2}}} - \frac{f_z^2}{(f_x^2 + f_y^2 + f_z^2)^{\frac{3}{2}}}\right)\left(f_{yz} - \frac{f_y f_{zz}}{f_z}\right)$$

$$= \hat{x}\left(\frac{f_y^2 + f_z^2}{(f_x^2 + f_y^2 + f_z^2)^{\frac{3}{2}}}\right)\left(f_{xy} - \frac{f_y f_{xz}}{f_z}\right) +$$

$$\hat{y}\left(\frac{f_x^2 + f_z^2}{(f_x^2 + f_y^2 + f_z^2)^{\frac{3}{2}}}\right)\left(f_{yy} - \frac{f_y f_{yz}}{f_z}\right)$$

$$+\hat{z}\left(\frac{f_x^2 + f_y^2}{(f_x^2 + f_y^2 + f_z^2)^{\frac{3}{2}}}\right)\left(f_{yz} - \frac{f_y f_{zz}}{f_z}\right) \quad (77)$$

$$S_{uuu} \cdot N = \left[0, 0, \frac{-6f_x f_z f_{xz}^2 + 3f_x f_z^2 f_{xxz} - 3f_x^2 f_z f_{xzz} + f_x^3 f_{zzz} - f_z^3 f_{xxx}}{f_z^4} + \frac{9f_x^2 f_{xz} f_{zz} + 3f_z^2 f_{xx} f_{xz} - 3f_x f_z f_{xx} f_{zz}}{f_z^4} - \frac{3f_x^3 f_{zz}^2}{f_z^5}\right]^T \cdot \quad (78)$$

$$\frac{[f_x, f_y, f_z]^T}{(f_x^2 + f_y^2 + f_z^2)^{\frac{1}{2}}}$$

$$= \frac{1}{(f_x^2 + f_y^2 + f_z^2)^{\frac{1}{2}}}$$

$$\begin{pmatrix} \frac{-6f_x f_z f_{xz}^2 + 3f_x f_z^2 f_{xxz} - 3f_x^2 f_z f_{xzz} +}{f_z^3} + \\ \frac{f_x^3 f_{zzz} - f_z^3 f_{xxx}}{f_z^3} + \\ \frac{9f_x^2 f_{xz} f_{zz} + 3f_z^2 f_{xx} f_{xz} - 3f_x f_z f_{xx} f_{zz}}{f_z^3} - \frac{3f_x^3 f_{zz}^2}{f_z^4} \end{pmatrix}$$

$$S_{uu} \cdot N_u = \left[0, 0, \frac{-f_x^2 f_{zz} + 2f_x f_z f_{xz} - f_z^2 f_{xx}}{f_z^3}\right]^T \cdot$$

$$\begin{bmatrix} \left(\frac{f_y^2 + f_z^2}{(f_x^2 + f_y^2 + f_z^2)^{\frac{3}{2}}}\right)\left(f_{xx} - \frac{f_x f_{xz}}{f_z}\right), \\ \left(\frac{f_x^2 + f_z^2}{(f_x^2 + f_y^2 + f_z^2)^{\frac{3}{2}}}\right)\left(f_{xy} - \frac{f_x f_{yz}}{f_z}\right), \\ \left(\frac{f_x^2 + f_y^2}{(f_x^2 + f_y^2 + f_z^2)^{\frac{3}{2}}}\right)\left(f_{xz} - \frac{f_x f_{zz}}{f_z}\right) \end{bmatrix}^T$$

-continued $$= \frac{1}{f_z^3(f_x^2 + f_y^2 + f_z^2)^{\frac{3}{2}}} \tag{79}$$

$$\begin{pmatrix} 2f_x^3 f_z f_{xz}^2 - f_x^2 f_z^2 f_{xx} f_{xz} - f_x^2 f_y^2 f_{xz} f_{zz} + \dfrac{f_x^5 f_{zz}^2}{f_z} + \\ 2f_x f_y^2 f_z f_{xz}^2 - f_x^4 f_{xz} f_{zz} - f_y^2 f_z^2 f_{xx} f_{xz} - \\ 2f_x^4 f_{xz} f_{zz} + f_x^3 f_z f_{xx} f_{zz} + \dfrac{f_x^3 f_y^2 f_{zz}^2}{f_z} - \\ 2f_x^2 f_y^2 f_{xz} f_{zz} + f_x f_y^2 f_z f_{xx} f_{zz} \end{pmatrix}$$

Computation of Invariant Measures

Using the derivatives calculated previously, the coefficients of the symmetric covariant 3-tensor are computed as:

$$P = S_{uuu} \cdot N + 3S_{uu} \cdot N_u \tag{80}$$

$$Q = S_{uuv} \cdot N + S_{uu} \cdot N_v + 2S_{uv} \cdot N_u \tag{81}$$

$$S = S_{uvv} \cdot N + S_{vv} \cdot N_u + 2S_{uv} \cdot N_v \tag{82}$$

$$T = S_{vvv} \cdot N + 3S_{vv} \cdot N_v \tag{83}$$

Finally, the following third order differential invariants $\Theta_1 \ldots \Theta_6$ are computed as a function of image intensities, where $$\Theta_1 = g^{i\alpha} g^{j\beta} g^{k\gamma} b_{ij,k} b_{\alpha\beta,\gamma}$$

$$\Theta_2 = g^{ij} g^{\alpha\beta} g^{k\gamma} b_{ij,k} b_{\alpha\beta,\gamma}$$

$$\Theta_3 = g^{i\alpha} g^{j\beta} g^{kl} g^{\delta\gamma} b_{l\delta} b_{ij,k} b_{\alpha\beta,\gamma}$$

$$\Theta_4 = g^{ij} g^{\alpha\beta} g^{kl} g^{\delta\gamma} b_{l\delta} b_{ij,k} b_{\alpha\beta,\gamma}$$

$$\Theta_5 = g^{il} g^{\alpha\delta} g^{jm} g^{\beta\xi} g^{k\gamma} b_{l\delta} b_{m\xi} b_{ij,k} b_{\alpha\beta,\gamma}$$

$$\Theta_6 = g^{il} g^{\alpha\delta} g^{jm} g^{\beta\xi} g^{kn} g^{\gamma\eta} b_{l\delta} b_{m\xi} b_{n\eta} b_{ij,k} b_{\alpha\beta,\gamma} \tag{84}$$

or using the following equations, $$\Theta_1 = P^2 + 3Q^2 + 3S^2 + T^2 \tag{85}$$

$$\Theta_2 = (P+S)^2 + (Q+T)^2$$

$$\Theta_3 = \kappa_1(P^2 + 2Q^2 + S^2) + \kappa_2(Q^2 + 2S^2 + T^2)$$

$$\Theta_4 = \kappa_1(P+S)^2 + \kappa_2(Q+T)^2$$

$$\Theta_5 = \kappa_1^2(P^2 + Q^2) + 2\kappa_1\kappa_2(Q^2 + S^2) + \kappa_2^2(S^2 + T^2)$$

$$\Theta_6 = \kappa_1^3 P^2 + 3\kappa_1^2\kappa_2 Q^2 + 3\kappa_1\kappa_2^2 S^2 + \kappa_2^3 T^2$$

Practical Application of the Theory

FIG. 1 illustrates a method of processing a three-dimensional medical image. The method can be used to detect lesions (including colon polyps, lung nodules, liver lesions, mammographic masses or brain lesions) by distinguishing lesions from the surrounding tissue. Put simply, the method works by using third order derivatives of intensity values in the three dimensional medical image to characterise the geometry (and, more particularly, variations in the curvature) of an iso-intensity surface in the medical image. Since lesions and other abnormalities have a different curvature from the surrounding healthy tissue, lesions can automatically be detected by looking for subtle variations in curvature via the third order invariant and semi-invariant measures disclosed herein.

The input to the method is three-dimensional medical image data. The three-dimensional medical image data can be generated by a computed tomography (CT) scan, or from a magnetic resonance imaging (MRI) scan, a positron emission tomography (PET) scan, an ultrasound scan or from an x-ray image. It will be appreciated that other suitable medical imaging methods can also be used.

For example, when the medical image data is generated by a CT scan, the three-dimensional medical image data comprises a series of CT image slices obtained from a CT scan of an area of a human or animal patient. Each slice is a two-dimensional digital greyscale image of the x-ray absorption of the scanned area. The properties of the slice depend on the CT scanner used; for example, a high-resolution multi-slice CT scanner may produce images with a resolution of 0.5-1.0 mm/pixel in the x and y directions (i.e. in the plane of the slice). Each pixel may have a 16-bit greyscale representation. The intensity value of each pixel may be expressed in Hounsfield units (HU). Sequential slices may be separated by a constant distance along the z direction (i.e. the scan separation axis); for example, by a distance of between 0.5-2.5 mm. Hence, the scan image formed by a plurality of slices may be a three-dimensional (3D) greyscale image, with an overall size depending on the area and number of slices scanned. Each pixel may then be considered to be a voxel (or volumetric pixel) in three-dimensional space.

The first step 100 in the method illustrated by FIG. 1 is to determine third order derivatives of the image. The inventors' preferred way of calculating the third order derivatives of the image is to convolve of the image with derivatives of Gaussian kernels, which results in the first order derivatives ($f_x$, $f_y$ and $f_z$), the second order derivatives ($f_{xx}$, $f_{xy}$, $f_{xz}$, $f_{yy}$ etc.) and the third order derivatives ($f_{xyz}$, $f_{xyy}$, $f_{zzz}$, $f_{yxz}$ etc.). The advantage of calculating the derivatives of the image in this way is that convolving the image with derivatives of Gaussian kernels inherently smoothes the image; thus, the need to smooth the image prior to calculating the derivatives is eliminated, and so less computation is required.

By way of explanation, the image intensity function I is a discrete, noisy data set obtained by sampling the underlying continuous data. Since differentiation amplifies noise, it would normally be necessary to smooth the intensity function prior to computation of derivatives; such smoothing is typically performed by convolving I with a Gaussian kernel. However, since convolution and differentiation are both linear operations, instead of smoothing the image and then differentiating it, it is more convenient to convolve the image with the derivative of the smoothing Gaussian kernel (rather than convolving the image with the Gaussian kernel itself). This technique is described in references [5] and [6]. A discrete Gaussian kernel and its derivatives can be calculated by directly sampling them from their continuous counterparts. Once the partial derivatives of the image data are computed by convolution with the approximate Gaussian kernel and its derivatives, the invariant/semi-invariant measures can be easily calculated as described below.

Alternatively, the derivatives of the image can be calculated by a known numerical differentiation method. For example, the central difference method can be used to calculate derivatives of the image based upon the intensity values at voxels neighbouring the voxel of interest. Where the derivatives of the image are calculated by a numerical differentiation method, it may be necessary to pre-process the image to filter noise and/or to smooth the image.

Step 100 may be preceded by a step of receiving a medical image or receiving medical image data. The medical image may be received from a medical scanner, from another computer or from a storage medium.

Step 100 may also be preceded by a step of pre-processing the medical image data. For example, the medical image data may be pre-processed to reduce noise in the image; a known anisotropic diffusion algorithm is suitable for this purpose. However, if the derivatives are calculated by convolving the image with derivatives of Gaussian kernels as described above then, advantageously, it may be unnecessary to perform pre-processing to reduce noise. As another example of pre-processing that might be performed, a known "electronic bowel cleansing" algorithm may be used to remove or reduce the appearance of tagging fluid in the image. Tagging fluid is an agent that is placed in the colon prior to CT scanning in order to absorb x-rays.

In the second step 102 of the method, the third order derivatives are used to calculate invariant or semi-invariant features. That is, the derivatives that were calculated in step 100 are used to calculate the values of $\Theta_1 \ldots \Theta_n$ (where n is greater than or equal to one). The invariant or semi-invariant features, $\Theta_1 \ldots \Theta_n$, characterise the local geometry at the point at which the derivatives of the iso-intensity surface were calculated in step 100.

When the derivatives (and hence the values of P, Q, S and T) are calculated in the principal directions, the resulting values $\Theta_1 \ldots \Theta_n$ are interchangeably referred to herein as "invariants", "invariant measures" or "invariant features". These values are said to be "invariant" because they are invariant with respect to the parameterisation of the surface; that is, the invariants have the same values regardless of the parameters used to define the iso-intensity surface S.

On the other hand, when the derivatives (and hence the values of P, Q, S and T) are calculated using Cartesian coordinate directions, the resulting values $\Theta_1 \ldots \Theta_n$ are interchangeably referred to herein as "semi-invariants", "semi-invariant measures" or "semi-invariant features". These values are said to be semi-invariant because they provide a good approximation of the invariant features, yet—strictly speaking—they are not "invariant" because they are not based upon derivatives calculated in the principal directions. The inventors have discovered that the invariant features calculated for a given point have generally similar values to the semi-invariant features calculated for that point, but the semi-invariant features are much easier and faster to compute. Thus, the time and computational resources required to process the medical image data can be reduced by calculating semi-invariant features in preference to invariant features.

In step 102 the values $\Theta_1$ to $\Theta_6$ are calculated using equation 85 and the values of the derivatives of the image that were calculated in step 100. In order to solve equation 85, the following calculations are performed in any suitable order: the values of $S_{uuu}$, $S_{vvv}$, $S_{uuv}$ and $S_{uvv}$ are calculated using equations 71, 72, 73 and 74 respectively; the values of $S_{uuu} \cdot N$ and are calculated using equations 78 and 79 respectively; the values of P, Q, S and T are calculated using equations 80, 81, 82 and 83 respectively, using the previously-calculated values of $S_{uuu}$, $S_{vvv}$, $S_{uuv}$, $S_{uvv}$, $S_{uuu} \cdot N$ and $S_{uu} \cdot N_u$; the values of E, F and G are calculated from equations 36 to 38 respectively; the values of L, M and N are calculated from equations 55 to 57 respectively; the values of H and K are calculated from equations 5 and 6 respectively, using the previously-calculated values of E, F, G, L, M and N; the principal curvatures, $\kappa_1$ and $\kappa_2$, are calculated from equations 8 and 10, using the previously-calculated values of H and K; and, finally, the values of $\Theta_1$ to $\Theta_6$ are calculated from equation 85, using the previously calculated values of P, Q, S, T, $\kappa_1$ and $\kappa_2$.

It can be seen from the foregoing description that the third order derivatives and the invariant features associated with an iso-intensity surface in the three dimensional image have been calculated without explicitly extracting the surface (i.e. without calculating an analytic expression for the iso-intensity surface), and so it can be said that the derivatives are based upon an implicit representation of the iso-surface. By avoiding the need to explicitly extract the iso-intensity surface, the computational effort required to calculate the derivatives can be reduced.

Those skilled in the art will know that an iso-intensity surface is a locus of points (or voxels) in the three-dimensional medical image that have the same values. For example, where the medical image is generated by x-ray imaging, the iso-intensity surface is a locus of voxels having the same level of x-ray absorption. Thus, the shape of the iso-intensity surface reflects the shape of the tissue that was scanned to generate the medical image.

The third order derivatives and invariant/semi-invariant measures can be calculated at all points within a three-dimensional image, or they can be calculated only at certain points that are of particular interest. For example, in a CT slice of a colon, the third order derivatives and invariant/semi-invariant measures may be calculated only at voxels in the vicinity of the colon wall, where polyps are likely to occur; this can avoid unnecessary calculation over the remainder of the image, where polyps are unlikely to Occur.

The advantages of analysing medical images using third order derivatives and third order invariant (or semi-invariant) features are illustrated in FIGS. 2 to 4.

FIG. 2(*a*) shows a grey scale CT slice of a polyp attached to a colon wall. To assist in interpreting FIG. 2(*a*), FIG. 2(*j*) is a line drawing representation of FIG. 2(*a*) showing the locations of the colon wall, the polyp, healthy tissue and air inside the colon. FIGS. 2(*d*) to 2(*i*) show the maps for the third order invariant measures $\Theta_1$ to $\Theta_6$ respectively. Each of the maps shown in FIGS. 2(*d*) to 2(*i*) is generated by calculating the respective third order invariant measure at each of the voxels of the CT slice shown in FIG. 2(*a*). It can be seen from FIGS. 2(*d*) to 2(*i*) that the third order invariant measures clearly distinguish between the polyp and the colon wall. In particular, note how the polyp appears as a light spot in the centre of FIGS. 2(*d*) to 2(*g*) and 2(*i*), and as a dark spot in the centre of FIG. 2(*h*); in all cases the third order invariant measures provide good contrast between the polyp and the surrounding tissue, and therefore allow the polyp to be more easily detected. In comparison, FIGS. 2(*b*) and 2(*c*) respectively show a shape index map and a curvedness map, which are generated according to known methods. It can be seen from FIGS. 2(*b*) and 2(*c*) that shape index and curvedness do not provide good detection, i.e. do not clearly distinguish the polyp from the colon wall, and thereby risk generating a false positive or missing a true positive. Thus, the third order invariant and semi-invariant measures provide a good way of detecting polyps, lesions and other anatomical structures of interest. A further advantage is that the six third order invariant and semi-invariant measures disclosed herein can be equally effective (if not more effective) at detecting polyps, lesions and other anatomical structures as a far larger number of known measures for quantifying anatomical structures. Thus, the third order invariant and semi-invariant can reduce the time and computational resources that are required to detect polyps, lesions and other anatomical structures.

FIG. 3(*a*) shows a grey scale CT slice of a submerged polyp. To assist in interpreting FIG. 3(*a*), FIG. 3(*j*) is a line drawing representation of FIG. 3(*a*) showing the locations of the polyp, tagging fluid, healthy tissue and air inside the colon. A submerged polyp is a polyp that is covered by tagging fluid. The submersion of the polyp by the tagging fluid makes the polyp difficult to detect, since both the polyp and the tagging fluid have similar intensities in the CT scan; this problem is illustrated by FIG. 3(*a*), in which the polyp is indistinguishable from the tagging fluid. FIGS. 3(d) to 3(i) show the maps for the third order invariant measures $\Theta_1$ to $\Theta_6$ respectively, which are generated in a corresponding manner to FIGS. 2(d) to 2(i). It can be seen from FIGS. 3(d) to 3(i) that the third order invariant measures clearly distinguish between the polyp and the colon wall. Note how the polyp appears as a light spot in the centre of FIGS. 3(d) and 3(e), and as a dark spot in the centre of FIGS. 3(f) to 3(i). In comparison, FIGS. 3(b) and 3(c) respectively show a shape index map and a curvedness map, which are generated according to known methods. Once again, shape index and curvedness do not provide good detection and, in particular, the shape index map fails to capture the polyp clearly. In contrast, the third order invariants allow the polyp to be detected, and overcome the problem of distinguishing a polyp that is submerged in tagging fluid.

Figure 4A:
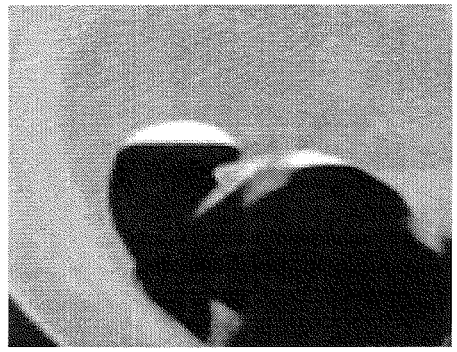
FIG. 4 shows processed and unprocessed medical images of a polyp attached to a fold.
Figure 4B:
Figure 4C:
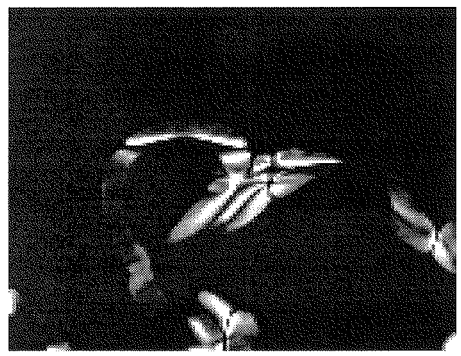
Figure 4D:
Figure 4E:
Figure 4F:
Figure 4G:
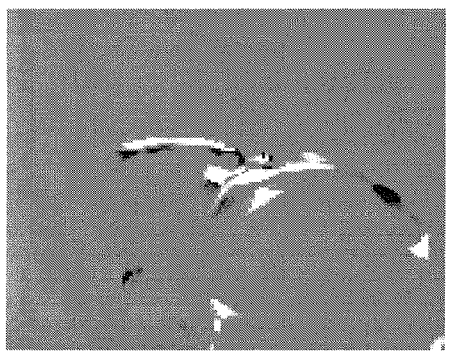
Figure 4H:
Figure 4I:
Figure 4J:
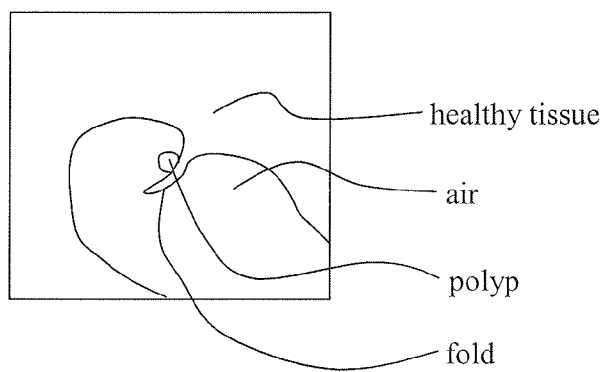

FIG. 4(a) shows a grey scale CT slice of a polyp that is attached to a haustral fold. By way of explanation, the colon is composed of numerous sac-like objects called haustra, and haustral folds are protrusions formed where one haustrum touches another haustrum. Haustral folds can make polyps difficult to detect. To assist in interpreting FIG. 4(a), FIG. 4(j) is a line drawing representation of FIG. 4(a) showing the locations of the polyp, the fold, healthy tissue and air inside the colon. FIGS. 4(d) to 4(i) show the maps for the third order invariant measures $\Theta_1$ to $\Theta_6$ respectively, which are generated in a corresponding manner to FIGS. 2(d) to 2(i). It can be seen from FIGS. 4(d) to 4(i) that the third order invariant measures clearly distinguish between the polyp and the fold. Indeed, the third order invariant measures not only detect the polyp, but also detach the polyp from the fold. Note how the polyp appears as a light spot in the centre of FIGS. 4(d) to 4(g) and 4(i), and as a dark spot in the centre of FIG. 4(h). In comparison, FIGS. 4(b) and 4(c) respectively show a shape index map and a curvedness map, which are generated according to known methods. Yet again, shape index and curvedness do not provide good detection.

Whilst FIGS. 2 to 4 illustrate the results of using the method disclosed herein to detect colon polyps, it will be appreciated that the method disclosed herein can also provide similarly advantageous results when used to detect lung nodules, liver lesions, mammographic masses, brain lesions and other sorts of lesions, tumours or abnormalities having suitable geometrical properties.

Returning to FIG. 1, further processing of the third order derivatives and/or the invariant (or semi-invariant) measures can optionally be performed. As one example of further processing that can be performed, the invariant or semi-invariant measures can be used as features in classifiers. The inventors have discovered that third order invariants and semi-invariants provide a particularly effective means for the computer-aided detection of anatomical structures (such as polyps, submerged polyps, lung nodules or lesions) because, as shown previously, these measures are very good at distinguishing the anatomical structures of interest from the surrounding tissue.

For example, the invariant or semi-invariant measures can be included in a feature vector that is provided to an artificial neural network (ANN), in order to train the ANN to recognise a particular anatomical structure that is of interest. Similarly, the invariant or semi-invariant measures can be included in a feature vector that is provided to a suitably trained ANN, in order that the ANN can detect the presence of the particular anatomical structure that is of interest. Not all of the possible invariant or semi-invariant measures needs to be included in the feature vector; for example, the feature set may include any one or more of the third order invariant measures $\Theta_1$ to $\Theta_6$. The feature vector may also include other suitable parameters that characterise the anatomical structures in the medical image data, such as shape index and/or curvature. It will also be appreciated that the invariant and semi-invariant measures can be used with other suitable artificial intelligence, pattern recognition or machine learning algorithms to detect anatomical structures of interest.

As another example of the further processing that can be performed using the invariant or semi-invariant measures, the statistical distribution of any one or more of the measures over a region of interest (known as a "candidate region") can be calculated. For example, the mean, variance, skewness, kurtosis, entropy, minimum value and/or maximum value of any one or more of the invariant or semi-invariant measures over the candidate regions may be calculated. The statistical distribution of the invariant or semi-invariant measures can then be used as a feature set to train a classifier (such as an ANN), and to detect the presence of particular anatomical structures in a candidate region using a suitably trained classifier. By working with the statistical distribution of the invariant or semi-invariant measures over a candidate region (rather than working with the invariant or semi-invariant measures directly) that the amount of computation required to analyse the candidate region can be reduced. Since the invariant and semi-invariant measures are calculated on a voxel-by-voxel basis, a large number of invariant or semi-invariant measures can be generated from a candidate region containing a relatively small number of voxels and significant computational resources may be required to analyse each of the resulting measures. By calculating statistics for the entire candidate region, the amount of data to be analysed can be reduced and, surprisingly, the statistics can be highly effective at detecting lesions, polyps and other anatomical structures of interest.

An conventional CAD system for polyp detection comprises two steps. In the first step, image processing techniques are intensively used in order to obtain polyp candidates (where a "polyp candidate" is the term used to describe an anatomical structure that might be a polyp, but which has not yet been confirmed to be a polyp). In this step, many features (e.g. based on intensity, shape and texture) can be used to characterize the polyp candidates. Generally, a large number of false positives (FPs) are produced by the first step and significantly outweigh the true positives (TPs). The goal of the second step is then to keep as many TPs as possible while maximally reducing the FPs. The features obtained in the first step can be used to distinguish TPs and FPs. Such a CAD system can be improved by using the invariant and semi-invariant measures disclosed herein at the first, second or both steps of the two-step CAD process. For example, invariant/semi-invariant measures (or statistics based on invariant/semi-invariant measures, as previously described) can be calculated over a large region of medical image data in order to identify a smaller region that is to be the candidate region for further analysis. Invariant/semi-invariant measures (or statistics based on invariant/semi-invariant measures) can be calculated over a candidate region in order to identify polyp candidates. Invariant/semi-invariant measures (or statistics based on invariant/semi-invariant measures) can be calculated for polyp candidates in order to classify the polyp candidates (for example, to classify them as benign or malignant, or to classify them as being a particular type of polyp).

Thus, the method described above uses third order derivatives, and invariant or semi-invariant features based upon those derivatives, to provide an improved method for computer-aided detection of lesions. The derivatives and invariant/semi-invariant features can also be used for:

Computer-aided classification of lesions: for example, lesions can be automatically classified as benign or malignant based upon the values of the invariant/semi-invariant features. As another example, colonic polyps can be automatically categorised as being a particular type of polyp using the values of the invariant/semi-invariant features.

Image segmentation: the invariant/semi-invariant features can be used to divide (or "segment") an image into different parts. For example, as illustrated by FIGS. 2 to 4, the invariant/semi-invariant features can be used to segment a polyp from a medical image. The invariant/semi-invariant features can be used to segment an image into a plurality of labels. For example, invariant/semi-invariant features can be used to segment a CT scan of the colon into a polyp, air, healthy tissue and/or tagging fluid.

Image registration: the invariant/semi-invariant features can be used to align (or "register") two images. For example, the invariant/semi-invariant features can be used as landmarks or as part of an objective function in order to determine how two or more images should be aligned with respect to one another. The invariant/semi-invariant features can be used to derive a spatial transformation that aligns two or more images with respect to one another. The spatial transformation can involve translation, rotation, scaling, shearing and/or any other suitable linear or non-linear transformation technique.

It will be recalled that f(x,y,z) was defined as an intensity function at each point of a smooth three-dimensional image. The equation for an iso-intensity surface is f(x,y,z)=I, where I is the fixed iso-value (see equation 31). The expressions for the third order derivatives and third order invariant measures that were derived above (under the heading "Theory of the Invention") were based upon the use of the implicit function theorem to define a function $\phi$ such that (x=u, y=v, z=ø(u, v) and f(u, v, œ(u, v))=I. The invention also covers the following alternative definitions of $\phi$: (x=ø(u,v), y=u, z=v and f(ø(u, v), u, v))=I; and (x=u, y=ø(u,v), z=v and f(u, ø(u, v), v))=I. It will be appreciated that these alternative definitions of $\phi$ will give rise to different expressions for the third order derivatives and the third order invariant and semi-invariant measures, and the invention also encompasses these alternative expressions.

Figure 5:
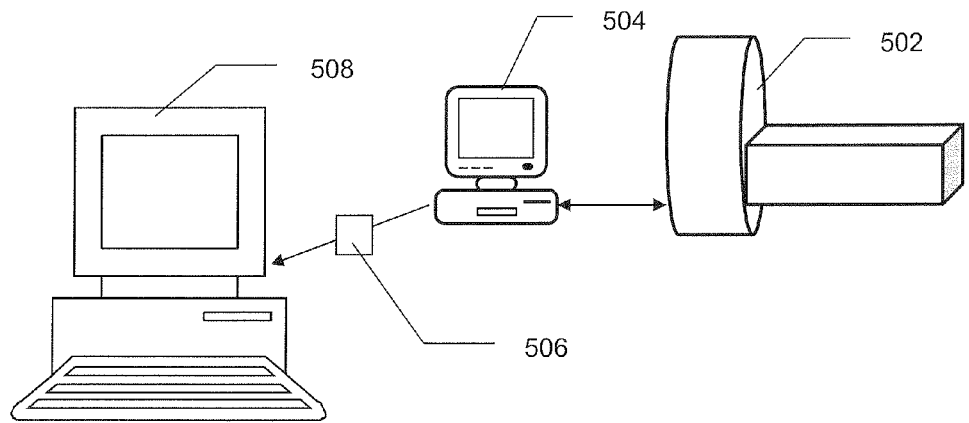
FIG. 5 is a schematic diagram showing a medical imaging device and a remote computer for processing image data from the medical imaging device.

An example of the apparatus used to implement the invention will now be described with reference to FIGS. 5 and 6. As shown in FIG. 5, a scan image may be created by a computer 504, which receives scan data from a scanner 502 and constructs the scan image. The scan image is saved as an electronic file or a series of files, which are stored on a storage medium 506, such as a fixed or removable disc. The scan image may include metadata associated with the scan image. The scan image may be analysed by the computer 504, or the scan image may be transferred to another computer 508 which runs software for processing the scan image in order to perform the method described above. The software may be stored on a carrier, such as a removable disc or a solid-state memory, or downloaded over a network such as a local area network (LAN), wide-area network (WAN), an internet or the Internet.

Figure 6:
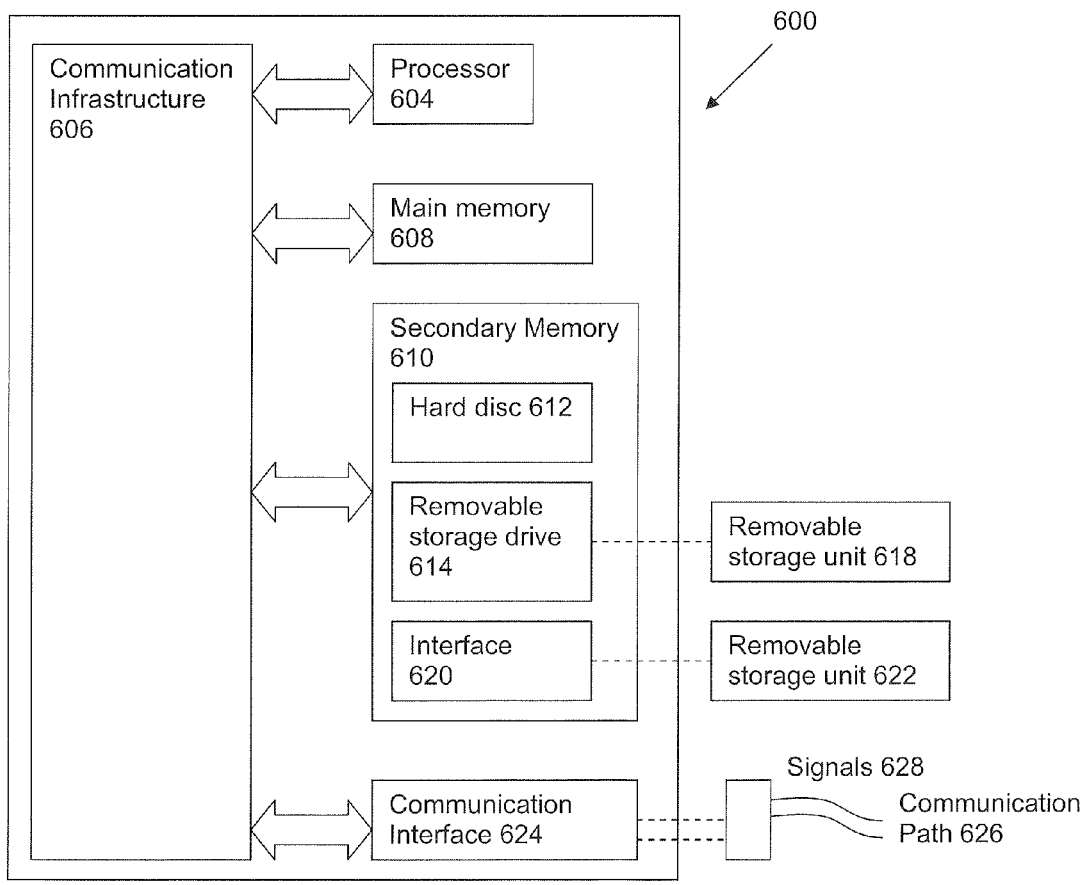
FIG. 6 is a more detailed diagram of the remote computer shown in FIG. 5.

The computers described herein may be computer systems 600 as shown in FIG. 6. Embodiments of the present invention may be implemented as programmable code for execution by the computer system 600. Various embodiments of the invention are described in terms of this example computer system 600. After reading this description, it will become apparent to a person skilled in the art how to implement the invention using other computer systems and/or computer architectures.

Computer system 600 includes one or more processors, such as processor 604. Processor 604 may be any type of processor, including but not limited to a special purpose or a general-purpose digital signal processor. Processor 604 is connected to a communication infrastructure 606 (for example, a bus or network). Various software implementations are described in terms of this exemplary computer system. After reading this description, it will become apparent to a person skilled in the art how to implement the invention using other computer systems and/or computer architectures.

Computer system 600 also includes a main memory 608, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, etc. Removable storage drive 614 reads from and/or writes to a removable storage unit 618 in a well-known manner. Removable storage unit 618 represents a floppy disk, magnetic tape, optical disk, etc., which is read by and written to by removable storage drive 614. As will be appreciated, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that previously found in video game devices), a removable memory chip (such as an EPROM, or PROM, or flash memory) and associated socket, and other removable storage units 622 and interfaces 620 which allow software and data to be transferred from removable storage unit 622 to computer system 600. Alternatively, the program may be executed and/or the data accessed from the removable storage unit 622, using the processor 604 of the computer system 600.

Computer system 600 may also include a communication interface 624. Communication interface 624 allows software and data to be transferred between computer system 600 and external devices. Examples of communication interface 624 may include a modem, a network interface (such as an Ethernet card), a communication port, a Personal Computer Memory Card International Association (PCMCIA) slot and card, etc. Software and data transferred via communication interface 624 are in the form of signals 628, which may be electronic, electromagnetic, optical, or other signals capable of being received by communication interface 624. These signals 628 are provided to communication interface 624 via a communication path 626. Communication path 626 carries signals 628 and may be implemented using wire or cable, fibre optics, a phone line, a wireless link, a cellular phone link, a radio frequency link, or any other suitable communication channel. For instance, communication path 626 may be implemented using a combination of channels.

The terms "computer program medium" and "computer usable medium" are used generally to refer to media such as removable storage drive 614, a hard disk installed in hard disk drive 612, and signals 628. These computer program products are means for providing software to computer system 600. However, these terms may also include signals (such as electrical, optical or electromagnetic signals) that embody the computer program disclosed herein.

Computer programs (also called computer control logic) are stored in main memory 608 and/or secondary memory 610. Computer programs may also be received via communication interface 624. Such computer programs, when executed, enable computer system 600 to implement the present invention as discussed herein. Accordingly, such computer programs represent controllers of computer system 600. Where the invention is implemented using software, the software may be stored in a computer program product and loaded into computer system 600 using removable storage drive 614, hard disk drive 612, or communication interface 624, to provide some examples.

In alternative embodiments, the invention can be implemented as control logic in hardware, firmware, or software or any combination thereof.

Whilst the preceding description has focussed upon the calculation of the third order invariants on CTC examinations for the purposes of highlighting colonic polyps, the invariants can be used to detect the presence of other lesions in different parts of the body, e.g., lung nodules, liver lesions, mammographic masses, brain lesions, and tumours. Further, the invariants can also be calculated on medical images from other modalities, including MRI, PET, and ultrasound. The invariant features also have applications outside the field of medical image processing, and may be used to process non-medical images in order to identify objects in those images.

It will be understood that the invention has been described above purely by way of example, and that modifications of detail can be made within the scope of the invention.

REFERENCES

The following documents are herein incorporated by reference in their entirety:

[1] H. Yoshida, Y. Masutani, P. Maceneaney, D. T. Rubin, and A. H. Dachman. Computerized detection of colonic polyps at ct colonography on the basis of volumetric features: Pilot study. *Radiology*, 222(2):327-336, 2002.

[2] H. Yoshida and J. Nappi. Three-dimensional computer-aided diagnosis scheme for detection of colonic polyps. *IEEE Transactions on Medical Imaging*, 20(12):1261-1274, 2001.

[3] M. do Carmo. Riemannian geometry. *Birkhuser, Boston*, 1992.

[4] E. Mehlum and T. Christian. Invariant smoothness measures for surfaces. *Advances in Computational Mathematics*, 8(1-2):49-63, 1998.

[5] O. Monga and S. Benayoun. Using partial derivatives of 3d images to extract typical surface features. *Proceedings of the Third Annual Conference of Integrating Perception, Planning and Action*, pages 225-236, 1992.

[6] J. Thirion and A. Gourdon. Computing the differential characteristics of isointensity surface. *Computer Vision and Image Understanding*, 61(2):190-202, 1992.

[7] J. Gravesen and M. Ungstrup. Constructing invariant fairness measures for surfaces. *Advances in Computational Mathematics*, 17(1-2):67-88, 2002.

What is claimed is:

1. A method for characterizing a point in a three-dimensional digital medical image, the method comprising:
    determining, by a processor, third order derivatives of the three-dimensional digital medical image at one or more points within the three-dimensional digital medical image;
    determining, by the processor, at each of the one or more points, using the third order derivatives of the three-dimensional digital medical image, one or more invariant features that characterize a local geometry at the point, each of the one or more invariant features being invariant with respect to a parameterization of a surface which relates to the local geometry; and
    characterizing each of the one or more points using the one or more determined invariant features; and
    distinguishing a first area within the three-dimensional medical image which relates to an abnormal tissue from a second area within the three-dimensional medical image which relates to a normal body tissue, based on a contrast therebetween with respect to greyscale representations of points included in the first area and points included in the second area,
    wherein the characterizing comprises assigning a respective greyscale representation to each point in the three-dimensional medical image based on the determined third-order derivative for the corresponding point.

2. The method of claim 1, wherein said determining one or more invariant features comprises determining covariant derivatives using the third order derivatives of the three-dimensional digital medical image.

3. The method of claim 1, further comprising, for each of the one or more points, determining the local geometry using an implicit iso-surface.

4. The method of claim 1, wherein said determining the one or more invariant features comprises calculating first, second, and third order derivatives of the three-dimensional digital medical image.

5. The method of claim 1, further comprising identifying an anatomical structure in the three-dimensional digital medical image using the one or more invariant features.

6. The method of claim 1, further comprising identifying a lesion in the three-dimensional digital medical image using the one or more invariant features.

7. The method of claim 6, wherein said identifying a lesion in the three-dimensional digital medical image includes using the one or more invariant features to reduce false positives.

8. The method of claim 1, further comprising using the one or more invariant features to segment the three-dimensional digital medical image into a plurality of labels.

9. The method of claim 1, further comprising deriving, using the one or more invariant features, a spatial transformation for aligning the three-dimensional digital medical image with one or more further image.

10. The method of claim 9, further comprising applying the spatial transformation to the three-dimensional digital medical image to align the three-dimensional digital medical image with the one or more further image.

11. A method for characterizing a point in a three dimensional digital medical image, the method comprising:
    determining, by a processor, third order derivatives of the three-dimensional digital medical image, at one or more points within the three-dimensional digital medical image;
    determining, by the processor, at each of the one or more points, using the third order derivatives of the three-dimensional digital medical image, one or more semi-invariant features that characterize a local geometry at the point, each of the one or more semi-invariant features being calculated using Cartesian coordinate directions to yield an approximation of a corresponding invariant feature which is invariant with respect to a parameterization of a surface which relates to the local geometry;
    characterizing each of the one or more points using the one or more determined semi-invariant features; and
    distinguishing a first area within the three-dimensional medical image which relates to an abnormal tissue from a second area within the three-dimensional medical image which relates to a normal body tissue, based on a contrast therebetween with respect to greyscale representations of points included in the first area and points included in the second area, wherein the characterizing comprises assigning a respective greyscale representation to each point in the three-dimensional medical image based on the determined third-order derivative for the corresponding point.

12. The method of claim 11, wherein said determining one or more semi-invariant features comprises determining derivatives of the three-dimensional digital medical image in Cartesian coordinates.

13. The method of claim 11, further comprising, for each of the one or more points, determining the local geometry using an implicit iso-surface.

14. The method of claim 11, wherein said determining one or more semi-invariant features comprises calculating first, second, and third order derivatives of the three-dimensional digital medical image.

15. The method of claim 11, further comprising identifying an anatomical structure in the three-dimensional digital medical image using the one or more semi-invariant features.

16. The method of claim 11, further comprising identifying a lesion in the three-dimensional digital medical image using the one or more semi-invariant features.

17. The method of claim 16, wherein said identifying a lesion in the three-dimensional digital medical image includes using the one or more semi-invariant features to reduce false positives.

18. The method of claim 11, further comprising using the one or more semi-invariant features to segment the three-dimensional digital medical image into a plurality of labels.

19. The method of claim 11, further comprising deriving, using the one or more semi-invariant features, a spatial transformation for aligning the three-dimensional digital medical image with one or more further image.

20. The method of claim 19, further comprising applying the spatial transformation to the three-dimensional digital medical image to align the three-dimensional digital medical image with the one or more further image.

21. An article of manufacture including a non-transitory computer readable storage medium having stored thereon computer-executable instructions, execution of which by a computing device causes the computing device to perform processes comprising:
  determining third order derivatives of a three-dimensional digital medical image, at one or more points within the three-dimensional digital medical image;
  determining, at each of the one or more points, one or more invariant or semi-invariant features that characterize a local geometry at the point using the third order derivatives of the three-dimensional digital medical image, each of the one or more invariant features being invariant with respect to a parameterization of a surface which relates to the local geometry, and each of the one or more semi-invariant features being calculated using Cartesian coordinate directions to yield an approximation of a corresponding one of the one or more invariant features which is invariant with respect to the parameterization of the surface which relates to the local geometry;
  characterizing each of the one or more points using the one or more determined invariant features; and
  distinguishing a first area within the three-dimensional medical image which relates to an abnormal tissue from a second area within the three-dimensional medical image which relates to a normal body tissue, based on a contrast therebetween with respect to greyscale representations of points included in the first area and points included in the second area, wherein the characterizing comprises assigning a respective greyscale representation to each point in the three-dimensional medical image based on the determined third-order derivative for the corresponding point.

22. An apparatus comprising:
  a communication interface which is configured to receive scan data; and
  a processor which is configured to determine third order derivatives of a three-dimensional digital medical image which is based on the received scan data, at one or more points within the three-dimensional digital medical image, and to determine, at each of the one or more points, one or more invariant or semi-invariant features that characterize a local geometry at the point using the third order derivatives of the three-dimensional digital medical image, each of the one or more invariant features being invariant with respect to a parameterization of a surface which relates to the local geometry, and each of the one or more semi-invariant features being calculated using Cartesian coordinate directions to yield an approximation of a corresponding one of the one or more invariant features which is invariant with respect to the parameterization of the surface which relates to the local geometry,
  wherein the processor is further configured to distinguish a first area within the three-dimensional medical image which relates to an abnormal tissue from a second area within the three-dimensional medical image which relates to a normal body tissue, based on a contrast therebetween with respect to greyscale representations of points included in the first area and points included in the second area, the greyscale representations being assigned to each point in the three-dimensional medical image based on the determined third-order derivative for the corresponding point.

23. The method of claim 1, wherein at least one of the invariant features is derived based on applying at least one of a plurality of Codazzi equations to an expression relating to a regular parameterization of a surface of the three-dimensional digital medical image,
  wherein the Codazzi equations yield coefficients for a symmetric covariant 3-tensor quantity.

24. The method of claim 11, wherein at least one of the semi-invariant features is derived based on using Cartesian coordinate directions in conjunction with applying at least one of a plurality of Codazzi equations to an expression relating to a regular parameterization of a surface of the three-dimensional digital medical image,
  wherein the Codazzi equations yield coefficients for a symmetric covariant 3-tensor quantity.

* * * * *